United States Patent Office 3,357,938
Patented Dec. 12, 1967

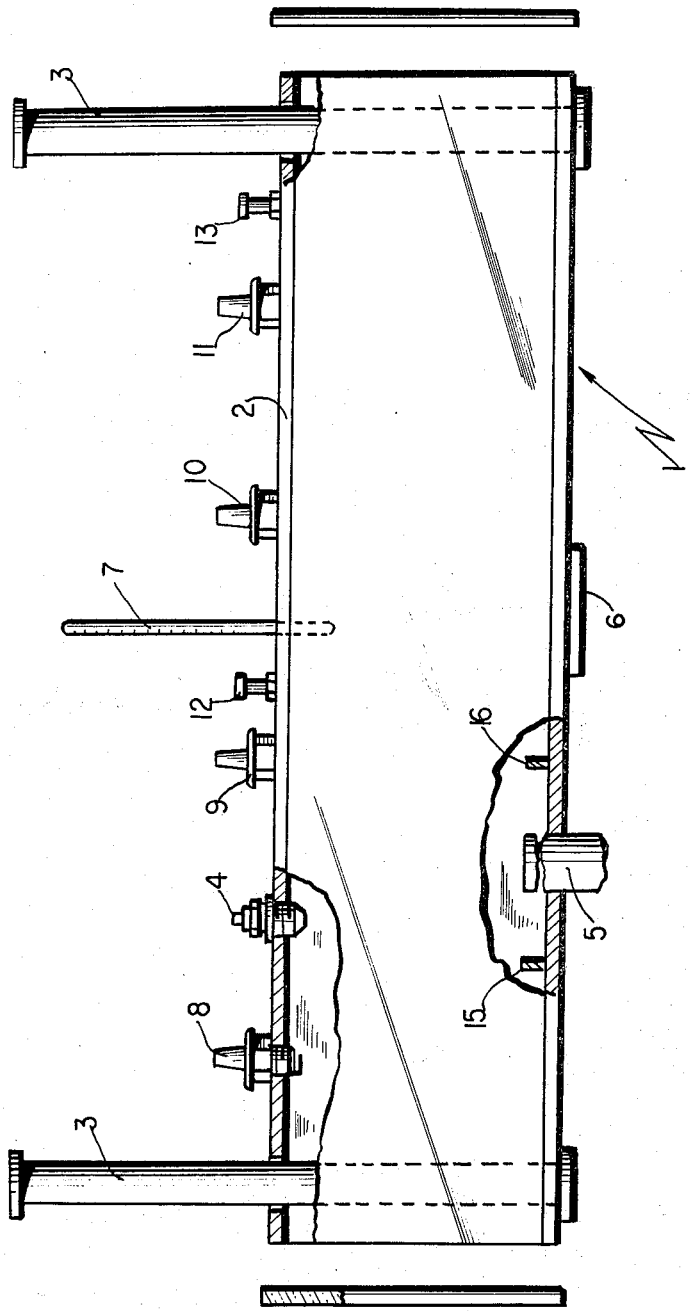

3,357,938
COATING COMPOSITION COMPRISING WATER-SOLUBLE RESIN, WATER AND VARIOUS SOLVENT REGULATORS
Johannes Eisenwiener, Guntramsdorf, near Vienna, Austria, assignor to Peter Stoll, Guntramsdorf, near Vienna, Austria, a corporation of Austria
Filed Oct. 31, 1962, Ser. No. 234,460
Claims priority, application Austria, Nov. 3, 1961, A 8,274/61
8 Claims. (Cl. 260—29.2)

ABSTRACT OF THE DISCLOSURE

Describes explosion and fireproof water-soluble coating compositions for use in flow coating apparatus in which solvent regulators comprising higher alcohols, higher glycols, lower alcohols, hydrocarbons and lower glycols and derivatives thereof having flash points below specified limits are used.

The invention relates to coating agents, especially to coating of objects in a flow-coater.

Next to the customary methods of application such as application by hand, various methods of spraying etc., the methods of flow-coating and dipping have recently achieved growing importance due to their economical use. This refers chiefly to the method known as "flow-coating." In this method objects to be covered with a coating agent are flow coated in a spraying chamber by means of spraying jets with the coating agent, afterwards passed through a drain tunnel whereafter dripping off of the excess of coating agent the coat adhering to the objects thus treated evens out, smooths and assumes faultless condition.

For these methods of application coating agents have so far been used which consist of solutions of natural or synthetic resins and customary pigments in organic solvents. Although in flow-coating good results may be achieved also with such coating agents, the application of same brings along great drawbacks. In view of the fact that the solvents normally employed are as a rule more or less volatile and/or combustible, their application involves not only increased risk of fire but also danger of explosion. This applies especially to coating agents of said composition in a flow coater apparatus where a relatively high consumption of solvents is inevitable. In the latter form of application, in the drain tunnel which must be equipped with apertures for the entrance and exit of the objects to be coated, mixtures of solvent vapour and air are being formed comprising all possible mixture-ratios ranging from low solvent concentrations in the region of the outer ends of the plant to a practically saturated concentration in the neighbourhood of the spraying jets. In the dipping process also, especially in small operation halls and at elevated temperature above the dipping tank such coating agent-vapour-air mixtures are being formed.

All these danger sources require strictest operational control and other measures to counteract them which create a quite remarkable increase of operational cost.

The incontestable advantages of these methods of application can therefore only be made efficacious if one succeeds in diminishing and eventually completely eliminating the above mentioned disadvantages resulting from the kind of coating agents applied.

The known coating agents which are dilutable with water or dispersible with water, representing as finished products dispersions, emulsions or chemical solutions or their combinations of natural or synthetic resins in water, and which would therefore be suitable for the desired form of application, do not technically meet the requirements with regard to technical properties due to the relatively bad technological qualities of films based on dispersions on one side and the bad adaptability of real water solutions during application on the other. On the basis of these facts all tests carried out trying to bring coating agents of said compositions to an industrial scale have so far not led to satisfactory results.

In order to make available water soluble or water dilutable or water dispersible coating agents on a general basis successfully, they would besides the normally required qualities of a good coating agent have to meet the additional requirement, i.e. withstanding the tendency towards foaming and irregularity during the coating operation due to the contents of water, to turn within a short time into a smooth and impeccable film of paint of even thickness without formation of curtains and/or tears on the surface of the flow-coated objects which are mostly of a complicated shape, such as parts of automobiles. This general requirement refers to flow-coating as well as to all other methods of application, e.g. for dipping procedure where good levelling is especially necessary.

It has been found that the necessary technical property of such coating agents, especially of paints, may be achieved by adding materials, herein called regulators, preferably organic solvents which guarantee a smooth and uniform film of coating agent.

Furthermore, the presence of organic solvents may be advantageous for other reasons, e.g. to increase and regulate the storage stability.

On the other hand, the materials herein called regulators are combustible, inflammable and under certain conditions explosive. In order to meet the requirements of the practice, coating agents should be available which on one side show excellent technological and other qualities, such as good applicablility and stability, and on the other side do not cause fire or explosion danger during the application process. Such coating agents have so far been unknown.

Of all known methods of application the flow coating procedure is doubtless the most dangerous form as far as fire and explosion dangers are concerned. The reason is the fact that in flow-coating—as already mentioned before—in the joint spraying and draining chamber of the plant all possible concentration-ratios of coating agent vapour-air mixtures are formed which range from practically saturated concentrations in the neighbourhood of the spraying jets to minimal concentrations at the end of the drain tunnel opposite the spraying jets. Therefore the conditions are given for the possibility of exceeding the upper and lower explosion limit. On the other hand, if coating agents do not form explosive coating agent vapour-air mixtures in flow coating, it may be taken for granted that they prove non-explosive in all other forms of application, e.g. in dipping procedure. In all other forms of application the important point is that all the possible coating agent vapour-air mixtures are neither inflammable nor exposive, e.g. in dipping procedure where concentrations are formed ranging from high coating agent vapour-air mixture concentrations immediately above the dipping tank to the lowest concentrations at the furthest parts of the room. Analogous conditions exist in spraying of coating agents notwithstanding the fact whether there are closed spraying cabins or open spraying installations, therefore especially everywhere where coating agents are applied in closed-in rooms.

Since the organic solvents that may be used as regulators are combustible, inflammable and under certain conditions form explosive vapour-air mixtures, it is to be expected that when using coating agents containing regulators of said kind which by themselves or in a mixture with water have a flash point lower than ignition temperatures that might possibly occur, inflammation or explosion might take place.

Surprisingly it has been found that under practical working conditions when using higher alcohols with a flash point of at least 80° C. approximately and/or higher glycols and/or glycol derivates with a flash point of more than 38° C. approximately (measured according to DIN 53 213 and the flash point tester Pensky-Martens DIN 51 758) no ignition takes place if the ratio of the said solvents (herein called regulators of the 1st group) used in the coating agent to solids (binder plus pigment) is up to 4:1 weight part approximately and to water up to 15:1 weight parts approximately.

Furthermore it has been surprisingly found that further organic solvents, i.e. low alcohols with a flash point of under 80° C. approximately, low glycols and glycol derivates with a flash point of maximal 38° C. approximately, ester, ketone and ether as well as all their derivatives may be added to the coating agents. It was further been found that these materials, very inflammable by themselves (herein called regulators of the second group) may be used in higher percentage in combination with the aforementioned higher alcohols, glycols and glycol derivatives (regulators of the first group) as if the coating agent were composed of equal parts of solids and water alone without containing regulators of the first group.

The same applies also to mixtures of water, regulators of the first group and regulators of the second group. As an example is named on one hand a mixture of water plus 10% ethanol (regulator of the second group) which brings about ignition in the test apparatus, on the other hand a mixture of water plus 10% ethanol (regulator of the second group) plus 10% butyl-glycol (regulator of the first group) which does not bring about ignition. Under the described test conditions, adapted to operational conditions of the practice, the following quantities of regulators of the second group have been allowed: for regulators for the second group with a flash point of under 21° C. approximately a ratio of up to 1:20 weight parts approximately of solids (binder plus pigment) for those with a flash point of 21° C. to 50° C. approximately a ratio of up to 1:5 weight parts approximately of solids (binder plus pigment) and for those with a flash point of over 50° C. approximately up to 1:2 weight parts approximately of solids (binder plus pigment). At the same time, if such regulators of the second group are used, the following ratios of those regulators to the total amount of water plus regulators of the first group must be observed: for regulators of the second group with a flash point under 21° C. approximately up to 1:4 weight parts approximately, with a flash point of 21° C.–50° C. approximately up to 1:3 weight parts approximately and with a flash point of over 50° C. approximately up to 1:1 weight parts approximately.

As regulators of the first group the following materials may be used among others: nonanol, octyl alcohol, benzyl alcohol, ethylene glycol, ethyl glycol, propylene glycol, methyl glycol, butyl-diglycol, diethylene-glycol-monobutyl ether.

As regulators of the second group may be used e.g. n-butanol, propanol, i-butanol, amyl-alcohol, diethylenedi- oxide, toluene, xylene, solvent,-naphtha, benzine, hexaline, methyl-hexaline, propylacetate, butylacetate, methoxybutyl-acetate, amyl-acetate, ethyl-acetate, methyl-ethyl-ketone, glycerin-triethyl-ether, dichlorine-ethyl-ether.

It has therefore been found that in order to obtain the necessary technical paint qualities of the coating agent, the requirement of addition of regulators to water soluble coating agents may be met by maintaining the ratio of quantities such that the solvent vapour-air mixtures which are necessarily formed under normal working conditions when using those coating agents, lie beneath the ignition and explosion limit.

In order to determine the conditions under which—in using the coating agents of the invention—an inflammation or explosion of coating agent-vapour-air mixtures does not occur, a prismatic test cabin is used, the measurements of which correspond to the devices used in flow-coating, i.e. length to width to height: 14:1, 4:2.

In the enclosed drawings the scheme of such test cabin is outlined. The test cabin consists of a box 1 with cover 2. The cover of the box is only loosely attached so that in case of explosion the pressure may be compensated by the lifting of the cover. A lateral shifting of the cover is avoided by vertical shafts 3. Both front sides of the box 1 are open and can be partly or completely closed during the test trials with light transparent plastic panels—or foils. This is important to ensure that all possible proportions of coating agent-vapour-air mixtures that might develop under practical working conditions will occur. As already mentioned, under practical working conditions concentrations of organic solvents range from saturated concentrations in the immediate neighbourhood of the spray jet down to very low concentration values at the furthest ends of the tunnel, i.e. all degrees occur. In the test cabin which can be heated by means of heating and regulation devices, fixed under the floor of the test cabin, to a temperature corresponding to normal working conditions, preferably to 30° C. several ignition devices are spaced out over the whole length of the apparatus. In performing trials with fully opened front sides, with or without lateral air circulation by means of small ventilators, or with partly or fully closed front sides, guarantee is given that all concentration ratios that might develop in practice even in spatial deviation of the described geometrical relations will be tested, e.g. in the cover of the box four ignition plugs 8 to 11 (Bosch M 95 TI) are regularly spaced out as well as 2 incandescent lights 12 and 13 (Bosch KE/GFA 22/1). The incandescent lights show when heated up (22 v., 5 amps) a surface temperature of 700–750° C. The ignition plugs which are fed by a high tension transformer give a value of 45 watts (ignition current 100 ma., ignition tension 450 v.), i.e. an ignition energy of 45 Joule per second. Since as documented by literature the minimal ignition energies of organic solvents lie in the order of magnitude of $10^{-4}$ to $10^{-3}$ Joule, e.g. by switching on the ignition plugs for 10 seconds a security factor of the order of magnitude of $10^5$ may at least be reached.

By means of a spray jet 4 in the neighbourhood of one end of the box the coating agent to be tested or else the liquid to be tested is sprayed by a pump into the test cabin and is fed by an overflow pipe 5 attached to the floor of the cabin near the spray jet into a storage vat which is not marked visibly in the drawings. Before switching on the ignition installation the liquid to be tested is sprayed throughout a longer period until a state of equilibrium is obtained. In the floor of the test cabin two elevations 15 and 16 are provided between which a puddle of liquid can be formed. By heating by means of a heat resistance 6, the temperature of which may be regulated by means of a contact thermometer 7, the temperature may be brought to the desired degree.

On account of the conditions prevailing in the test cabin which with regard to the strictness of ignition conditions certainly exceed those existing in an actual flow coating installation, it can be inferred that a coating agent which does not shown ignition or explosion under the described conditions of spraying, ignition periods of 10 seconds, performance of the trial with fully opened and partially closed or fully closed frontal sides at temperatures up to 45° C. measured and regulated in the gas phase of the test cabin, may be considered without danger for practical use.

Hereunder examples of coating agents based on our invention will be illustrated:

EXAMPLE 1

| | Weight parts |
|---|---|
| Oxide red (Fe₂O₃) | 8 |
| Water soluble phenolic resin e.g. in accordance with Austrian Patent No. 198,585 | 17 |
| Methyl glycol (flash point 39° C.) | 75 |
| Water | 7.5 |

EXAMPLE 2

| | Weight parts |
|---|---|
| Rutile (TiO₂) | 10 |
| Water soluable melamine resin | 15 |
| Nonanol (flash point 83° C.) | 70 |
| Water | 15 |

EXAMPLE 3

| | Weight parts |
|---|---|
| Baryte white (BaSO₄) | 40 |
| Lithopone (ZnS and BaSO₄) | 20 |
| Water soluble polyester resin | 40 |
| Diethyl-glycol-monobutylether | 10 |
| Water | 10 |
| Benzine (flash point 20° C.) | 3 |

EXAMPLE 4

| | Weight parts |
|---|---|
| Rutile (TiO₂) | 20 |
| Water soluble acrylic resin | 30 |
| Butyl-diglycol | 15 |
| Water | 30 |
| Xylene (flash point 24° C.) | 5 |

EXAMPLE 5

| | Weight parts |
|---|---|
| Zinc sulfide | 40 |
| Water soluble phenolic resin | 40 |
| Ethylene glycol | 20 |
| Water | 20 |
| Methyl-hexaline (flash point 59° C.) | 40 |

Coating agents containing such regulators gixe excellent coating agents which practically shown none of the disadvantages of conventional coating agents or the water soluble and dispersible coating agents so far known and in their application explosion danger is eliminated. The invention is of course not restricted to coating agents the formulation of which has been cited above.

I claim:

1. Coating agents, especially suitable for covering objects in a flow-coater, consisting essentially of at least one water soluble synthetic resin; water; pigments; at least one first solvent regulator selected from the group consisting of higher alcohols having a flash point of at least about 80° C., and higher glycols and glycol derivatives having a flash point of at least about 38° C.; said first solvent regulators being present in an amount such that the weight parts of said first solvent regulators to weight parts solids is up to approximately 4:1 and the weight parts of said first solvent regulators to weight parts water is up to approximately 15:1; said coating agents having a vapor-air mixture under practical operational conditions beneath the ignition and explosion limit.

2. Coating agents according to claim 1 containing at least one second solvent regulator selected from the group consisting of lower alcohols, aromatic, cycloaliphatic and aliphatic hydrocarbons and derivatives thereof, ketones and derivatives thereof, esters and derivatives thereof, ethers and derivatives thereof and lower glycols and derivatives thereof; wherein said lower glycols and derivatives have a flash point of not greater than about 38° C. and the remaining second solvent regulators have a flash point of below about 80° C.; said second solvent regulators being present in an amount such that (1) the weight parts of said second solvent regulators to weight parts solids is up to approximately 1:20 when said second solvent regulators have a flash point under 21° C., up to approximately 1:5 when said second solvent regulators have a flash point of 21° C. to 50° C., up to approximately 1:2 when said second solvent regulators have a flash point over 50° C., and (2) the weight parts of said second solvent regulators to weight parts water plus weight parts of said first solvent regulators is up to approximately 1:4 when said second solvent regulators have a flash point under 21° C., up to approximately 1:3 when said second solvent regulators have a flash point of 21° C. to 50° C., up to approximixately 1:1 when said second solvent regulators have a flash point over 50° C.

3. Coating agents according to claim 1 wherein said first solvent regulator is selected from the group consisting of nonanol, octyl-alcohol, benzyl-alcohol, ethylene-glycol, ethyl-glycol, propylene-glycol, methyl-glycol, butyl-diglycol, and diethylene-glycol-monobutyl-ether.

4. Coating agents according to claim 2 wherein said second solvent regulator is selected from the group consisting of n-butanol, propanol, iso-butanol, amyl-alcohol, diethylene-dioxide, toluene, xylene, solvent-naphtha, benzine, hexaline, methyl-hexaline, propylene-acetate, butyl-acetate, methoxy-butyl-acetate, amyl-acetate, ethyl-acetate, methyl-ethyl ketone, glycerine-triethyl-ether, and dichlorin-ethyl-ether.

5. In a process for coating objects in a flow-coater apparatus by flow-coating said objects and thereafter drying, the improvement which comprises flowing over said objects coating compositions consisting essentially of at least one water soluble synthetic resin; water; pigments; at least one first solvent regulator selected from the group consisting of higher alcohols having a flash point of at least about 80° C., and higher glycols and glycol derivatives having a flash point of at least about 38° C.; said first solvent regulators being present in an amount such that the weight parts of said first solvent regulators to weight parts solids is up to approximately 4:1 and the weight parts of said first solvent regulators to weight parts water is up to approximately 15:1; said coating agents having a vapor-air mixture under practical operational conditions beneath the ignition and explosion limit.

6. A process according to claim 5 wherein the coating composition contains at least one second solvent regulator selected from the group consisting of lower alcohols, aromatic, cycloaliphatic and aliphatic hydrocarbons and derivatives thereof, ketones and derivatives thereof, esters and derivatives thereof, ethers and derivatives thereof and lower glycols and derivatives thereof; wherein said lower glycols and derivatives have a flash point of not greater than about 38° C. and the remaining second solvent regulators have a flash point of below about 80° C.; said second solvent regulators being present in an amount such that (1) the weight parts of said second solvent regulators to weight parts solids is up to approximately 1:20 when said second solvent regulators have a flash point under 21° C., up to approximately 1:5 when said second solvent regulators have a flash point of 21° C. to 50° C., up to appromixately 1:2 when said second solvent regulators have a flash point over 50° C., and (2) the weight parts of said second solvent regulators to weight parts water plus weight parts of said first solvent regulators is up to approximately 1:4 when said second solvent regulators have a flash point under 21° C., up to approximately 1:3 when said second solvent regulators have a flash point of 21° C. to 50° C., up to approximately 1:1 when said second solvent regulators have a flash point over 50° C.

7. A process according to claim 5 wherein said first solvent regulator is selected from the group consisting of nonanol, octyl-alcohol, benzyl-alcohol, ethylene-glycol, ethyl glycol, propylene-glycol, methyl-glycol, butyl-diglycol, and diethylene-glycol-monobutyl-ether.

8. A process according to claim 6 wherein said second solvent regulator is selected from the group consisting of n-butanol, propanol, iso-butanol, amyl-alcohol, diethylene-dioxide, toluene, xylene, solvent-naphtha, benzine, hexaline, methyl-hexaline, propylene-acetate, butyl-acetate, methoxy-butyl-acetate, amyl-acetate, ethyl-acetate, methyl-ethyl ketone, glycerin-triethyl-ether, and dichlorin-ethyl-ether.

References Cited
UNITED STATES PATENTS

| | | | |
|---|---|---|---|
| 3,146,122 | 8/1964 | Renner et al. | 117—102 |
| 2,940,874 | 6/1960 | Barnes | 117—104 |
| 3,034,915 | 5/1962 | Kornbluth | 117—104 |
| 2,332,939 | 10/1943 | Schmitz et al. | 260—29.2 |
| 2,405,965 | 8/1946 | Leekley | 260—29.2 |
| 2,602,072 | 7/1952 | Greubel | 260—29.2 |
| 2,714,097 | 7/1955 | Watson et al. | 260—29.2 |
| 3,027,341 | 3/1962 | Boucher et al. | 260—29.2 |
| 2,979,477 | 4/1961 | Land | 260—29.4 |
| 2,994,676 | 8/1961 | Kucsan et al. | 260—29.4 |
| 1,572,391 | 2/1926 | Klaiber | 73—15 |
| 2,391,161 | 12/1945 | Hubert | 73—15 |

GEORGE F. LESMES, *Primary Examiner.*

MURRAY TILLMAN, *Examiner.*

J. C. BLEUTGE, *Assistant Examiner.*